US 9,291,736 B2

(12) United States Patent
Le Meur et al.

(10) Patent No.: US 9,291,736 B2
(45) Date of Patent: Mar. 22, 2016

(54) SURFACE-CONSISTENT AMPLITUDE AND DECONVOLUTION SIMULTANEOUS JOINED INVERSION

(75) Inventors: David Le Meur, Gif-sur-Yvette (FR); Katia Garceran, Saint Cheron (FR)

(73) Assignee: CGGVERITAS SERVICES SA, Massy Cedex (FR)

( * ) Notice: Subject to any disclaimer, the term of this patent is extended or adjusted under 35 U.S.C. 154(b) by 881 days.

(21) Appl. No.: 13/553,859

(22) Filed: Jul. 20, 2012

(65) Prior Publication Data

US 2013/0176820 A1 Jul. 11, 2013

Related U.S. Application Data

(60) Provisional application No. 61/583,236, filed on Jan. 5, 2012.

(51) Int. Cl.
*G01V 1/36* (2006.01)
*G01V 1/30* (2006.01)

(52) U.S. Cl.
CPC .............. *G01V 1/366* (2013.01); *G01V 1/307* (2013.01)

(58) Field of Classification Search
CPC ....... G01V 1/366; G01V 1/307; G01V 1/308; G01V 2210/612
USPC .................................. 367/38, 47; 706/14, 16
See application file for complete search history.

(56) References Cited

FOREIGN PATENT DOCUMENTS

GB 2385435 A 8/2003

OTHER PUBLICATIONS

Garceran, et al. "Simulataneous Joint Inversion for Sureface-Consistent Amplitude and Deconvolution," 74th EAGE Conference & Exhibition incorporating SPE EUROPEC 2012, Copenhagen, Denmark, Jun. 4-7, 2012, 5 p.*
Stewart A. Levin; "Surface-consistent deconvolution"; Geophysics, vol. 54, No. 9; Sep. 1989; pp. 1123-1133; Dallas, TX.
John Millar, et al.; "Long wavelength surface consistent solutions"; Crewes Research Report; vol. 18; Society of Exploration Geophysicists; 2006 SEG Annual Meeting, Oct. 1-6, 2006 , New Orleans, Louisiana; pp. 1-17.
Larry Morley, et al.; "Predictive deconvolution in shot-receiver space"; Geophysics, vol. 48, No. 5; May 1983; pp. 515-531; Stanford, CA.
M. Turhan Taner, et al.; "Surface consistent corrections"; Geophysics, vol. 46, No. 1; Jan. 1981; pp. 17-22; Houston, TX.
M. Turhan Taner, et al.; "Estimation and Correction of Near-Surface Time Anomalies"; Geophysics, vol. 39, No. 4; Aug. 1974; pp. 441-463; Houston, TX.
Robbert van Vossen, et al.; "Surface-consistent deconvolution using reciprocity and waveform inversion"; Geophysics vol. 71, No. 2; Mar.-Apr. 2006; pp. V19-V29; Utrecht, The Netherlands.
Xishuo Wang, et al.; "Surface consistent deconvolution on seismic data with surface consistent noise"; Geo-X Systems, Ltd.; 2000; pp. 1-5; Calgary, Alberta, Canada.

(Continued)

*Primary Examiner* — Daniel L Murphy
(74) *Attorney, Agent, or Firm* — Patent Portfolio Builders PLLC (57) ABSTRACT

Methods and systems for a surface-consistent amplitude and deconvolution simultaneous joined inversion are described. A one-pass estimation using input trace data for generating gain and deconvolution operator based on a least squares iteration method. A series of iterations are performed simultaneously and independently estimating amplitude scalars and autocorrelation spectra with a common convergence criterion. The gain and deconvolution operator can further be used to correct the input trace data for pre-stack or stack imaging.

20 Claims, 8 Drawing Sheets

(56) References Cited

OTHER PUBLICATIONS

M.T. Taner, et al.; "Surface consistent estimation of source and receiver response functions"; 50th International SEG meeting; Nov. 5, 1980; Houston, TX.

Peter W. Cary et al., "Four-component surface-consistent deconvolution", Geophysics, Mar. 1993, pp. 383-392, vol. 58, No. 3.

British Search Report mailed Jun. 7, 2013, in related GB Application No. 1300128.4.

* cited by examiner

SURFACE-CONSISTENT AMPLITUDE AND DECONVOLUTION SIMULTANEOUS JOINED INVERSION

RELATED APPLICATION

The present application is related to, and claims priority from U.S. Provisional Patent Application No. 61/583,236, filed Jan. 5, 2012, entitled "Surface-Consistent Amplitude and Deconvolution Simultaneous Joined Inversion," to David Le Meur and Katia Garceran, the disclosure of which is incorporated herein by reference.

TECHNICAL FIELD

Embodiments of the subject matter disclosed herein generally relate to methods and systems for land-based or marine-based seismic data processing and, more particularly, to mechanisms and techniques for estimating surface-consistent amplitude and deconvolution corrections.

BACKGROUND

Land-based seismic data acquisition and processing techniques are used to generate a profile (image) of a geophysical structure (subsurface) of the underlying strata. This profile does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process.

The acquisition of data in land-based seismic methods usually produces different results in source strength and signature based on differences in near-surface conditions. Further data processing and interpretation of seismic data requires correction of these differences in the early stages of processing. Surface-consistent amplitude and deconvolution are commonly used in seismic time processing to correct a portion of the distortions generated by the near-surface irregularities on the recorded seismic data. In another aspect, the near-surface irregularities generate both amplitude decay and a more complicated frequency-dependent time-varying filtering effect.

A conventional approach of processing for the computation of surface consistent amplitude and deconvolution corrections is based on a two-step cascaded process. The first step of the cascaded process comprises computing the amplitude scalar i.e., the surface-consistent amplitude correction, for application to the seismic data. The second step of the cascaded process comprises computing a deconvolution operator on the amplitude corrected pre-stack data. Of note in the two-step cascaded process is the fact that usually different algorithms are used for the amplitude and deconvolution calculations even though the calculations involve the same set of assumptions and theories. The two processes are separately estimated because the amplitude scalars cannot be directly derived from the autocorrelation spectra during the deconvolution step itself.

Historically, the surface consistent concept and estimating residual statics was introduced by M. T. Tanner, F. Koelher and K. A. Alhilali in their 1974 article entitled "Estimation and Correction of Near-Surface Time Anomalies" published in Geophysics. Next, the surface-consistent concept was extended to deconvolution by M. T. Tanner and K. W. Coburn in their 1980 paper entitled "Surface Consistent Estimation of Source and Receiver Response Functions," presented at the 50th Annual International Meeting of the Society of Exploration Geophysicists. Then, the surface consistent deconvolution was refined with the addition of an average response factor, depending mainly on the average shot waveform by L. Morley and J. Claerbout in their 1983 article entitled "Predictive Deconvolution in Shot-Receiver Space" published in Geophysics. Next, the advantages of surface-consistent deconvolution as a means to obtain better statistical estimates of the filters was illustrated by S. Levin in his 1989 article entitled "Surface-Consistent" published in Geophysics.

Further, improvements related to robustness in the presence of noise as described by X. Wang, A. Chaney, M. Martin and M. Perz in their 2000 paper entitled "Surface Consistent Deconvolution on Seismic Data with Surface Consistent Noise" presented at the 2000 Meeting of the Canadian Society of Exploration Geophysicists, improving behavior in the long wavelengths by J. Millar and J. C. Bancroft in their 2006 paper entitled "Long Wavelength Solutions to the Surface Consistent Equations" published in the Society of Exploration Geophysicists Expanded Abstracts and using the reciprocity of the medium response by R. Van Vossen, A. Curtis, A. Laake and J. Tramped in their 2006 article entitled "Surface Consistent Deconvolution using Reciprocity and Waveform Inversion" published in Geophysics. Regarding the surface-consistent amplitude evolution, a performance factor as the natural logarithm of the average amplitude spectrum of the response function was introduced by M. T. Tanner and F. Koelher in their 1981 article entitled "Surface Consistent Corrections" published in Geophysics.

Accordingly, it would be desirable to provide systems and methods that avoid the afore-described problems and drawbacks, and improve the accuracy of the final image.

SUMMARY

According to an exemplary embodiment, a method, stored in a memory and executing on a processor, for estimating a surface-consistent amplitude correction and a deconvolution operator comprises simultaneously utilizing a plurality of input trace data, in a single pass, to calculate a Root Mean Square (RMS) amplitude and an autocorrelation spectrum, within an associated time window, for each of said plurality of input trace data; transforming said RMS amplitudes and said autocorrelation spectrum to a log domain and summing for each surface-consistent component value to create an initial amplitude log scalar and an initial spectra log-frequency sum estimate; performing one or more iterations to simultaneously and independently estimate an improved amplitude log scalar and a spectra log-frequency value for each surface-consistent component until a predetermined stop condition for said estimating is met; and outputting one or more of an estimated surface-consistent amplitude correction and a deconvolution operator based on reconstructing an amplitude scalar and a spectra log frequency sum, from said plurality of input trace data, after said stop condition is met.

According to another exemplary embodiment, a system for estimating a surface-consistent amplitude correction and a deconvolution operator comprises a dataset containing a plurality of input trace data; one or more processors configured to execute computer instructions and a memory configured to store said computer instructions wherein said computer instructions further comprise: an input trace data component for accessing said dataset and generating a Root Mean Square (RMS) amplitude value and an autocorrelation spectrum for each of said plurality of input trace data; a summation through all surface-consistent components for generating a complete initial amplitude scalars and spectra frequency sums; a simultaneous joined inversion component for estimating, simultaneously and independently, an amplitude log-scalar and a spectra log-frequency sum for each surface-consistent component; a reconstruction component for reconstructing an amplitude scalar and an autocorrelation spectrum based on said plurality of input trace data; and an operator computation component for generating a surface-consistent amplitude correction and a surface consistent deconvolution operator based on said amplitude scalar and said autocorrelation spectrum and outputting said amplitude correction and said deconvolution operator.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a schematic diagram of an inline stack of seismic data with FIG. 8a representing a conventional cascaded (two pass) surface-consistent amplitude and deconvolution flow and FIG. 8b representing a surface consistent simultaneous joined inversion amplitude and deconvolution flow.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of estimating more reliable surface-consistent attributes using a common inversion scheme. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to provide a context for the subsequent exemplary embodiments, a description of aspects and terminology is hereby included. The methods and systems described herein generate and receive P-waves and S-waves. A P-wave is the wave studied in conventional seismic data and is an elastic body wave or sound wave in which particles oscillate in the direction the wave propagates. P-waves incident on an interface at other than normal incidence can produce reflected and transmitted S-waves, otherwise known as converted waves.

An S-wave, generated by most land seismic sources and sometimes as converted P-waves, is an elastic body wave in which particles oscillate perpendicular to the direction in which the wave propagates. S-waves, also known as shear waves, travel more slowly than P-waves and cannot travel through fluids because fluids do not support shear. It should be noted that S-waves can also be converted to P-waves. Recording of S-waves requires receivers coupled to the solid earth and their interpretation can allow determination of rock properties such as fracture density and orientation, Poisson's ratio, and rock type by cross-plotting P-wave and S-wave velocities and other techniques.

In a further description of terminology, a shotpoint is one of a number of locations or stations at the surface of the earth at which a seismic source is activated. A seismic trace is the seismic data recorded, by one channel, after the seismic source has been fired. The seismic trace represents the response of the elastic wave field to velocity and density contrasts across interfaces of layers of rock or sediments as energy travels from the seismic source through the subsurface to a receiver or receiver array. Further, a seismic inversion is a process of transforming seismic reflection data into a quantitative property description of a strata description of an underground location and possibly a reservoir containing natural resources such as oil or gas.

Figure 1:
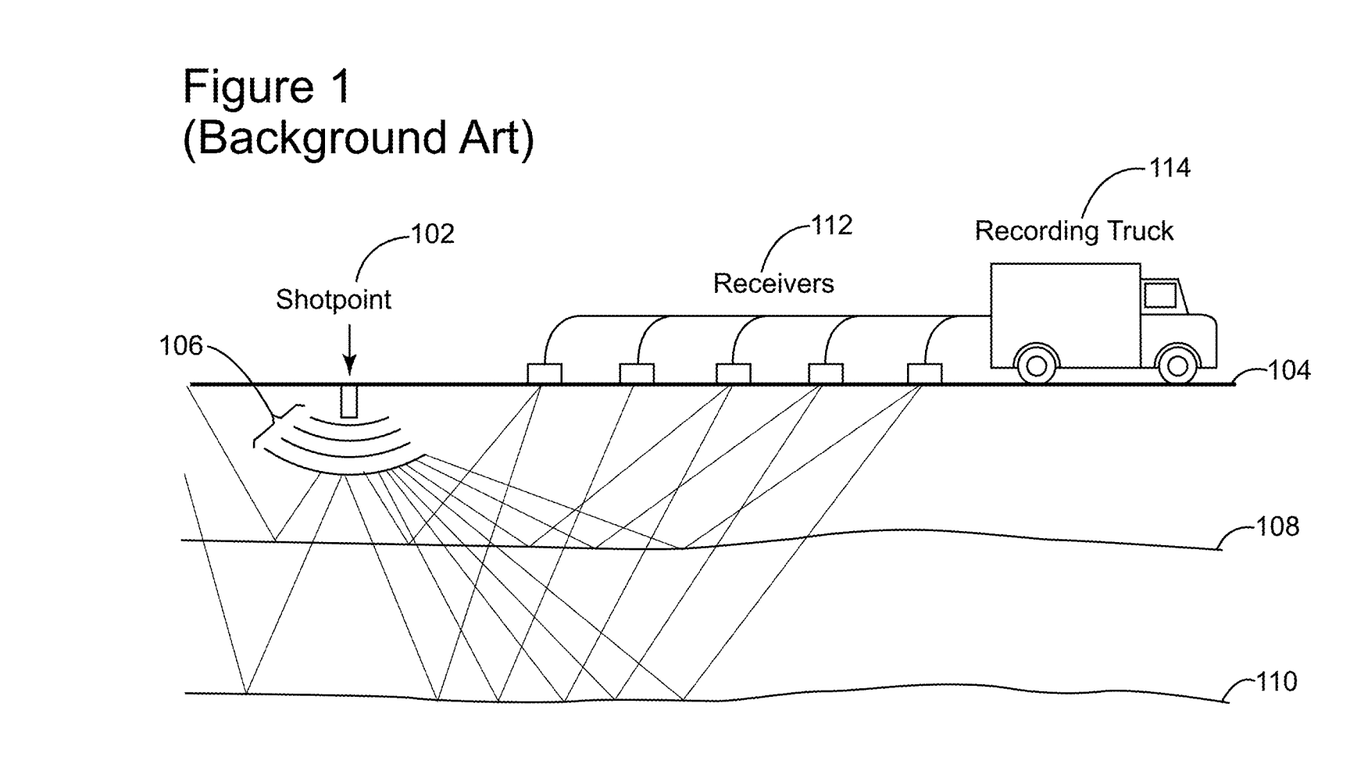
FIG. 1 is a background art schematic diagram showing a land-based seismic data acquisition system.

Looking now to FIG. 1, a context diagram illustrates the previously described aspects. A shot is fired at a shotpoint 102 on the surface 104 of the earth to propagate a series of waves 106 through different layers 108, 110 under the surface 104. The waves are reflected by the interfaces at the different layers 108, 110 at different times after the shot is fired and at different angles. The reflected waves are detected by receivers 112 attached to the earth. A recording device 114 collects the seismic data from the receivers and records the data for future analysis. It should be noted in the exemplary embodiment that computations on the recorded data can occur in the recording device 114 or they can occur in another location after the seismic data has been transferred.

Continuing with an exemplary embodiment, a surface-consistent amplitude and deconvolution simultaneous joined inversion is performed in a single pass of the input trace seismic data. The simultaneous joined inversion uses an iterative linear modeling approach, can operate on a parallel-processor designed system using either two-dimensional or three-dimensional data with either a narrow-azimuth or wide-azimuth seismic data acquisition design of the input dataset. It should be noted in the exemplary embodiment that a non-linear modeling approach can also be implemented. It should further be noted in the exemplary embodiment that the one-pass approach provides an improvement in computation time.

Figure 2:
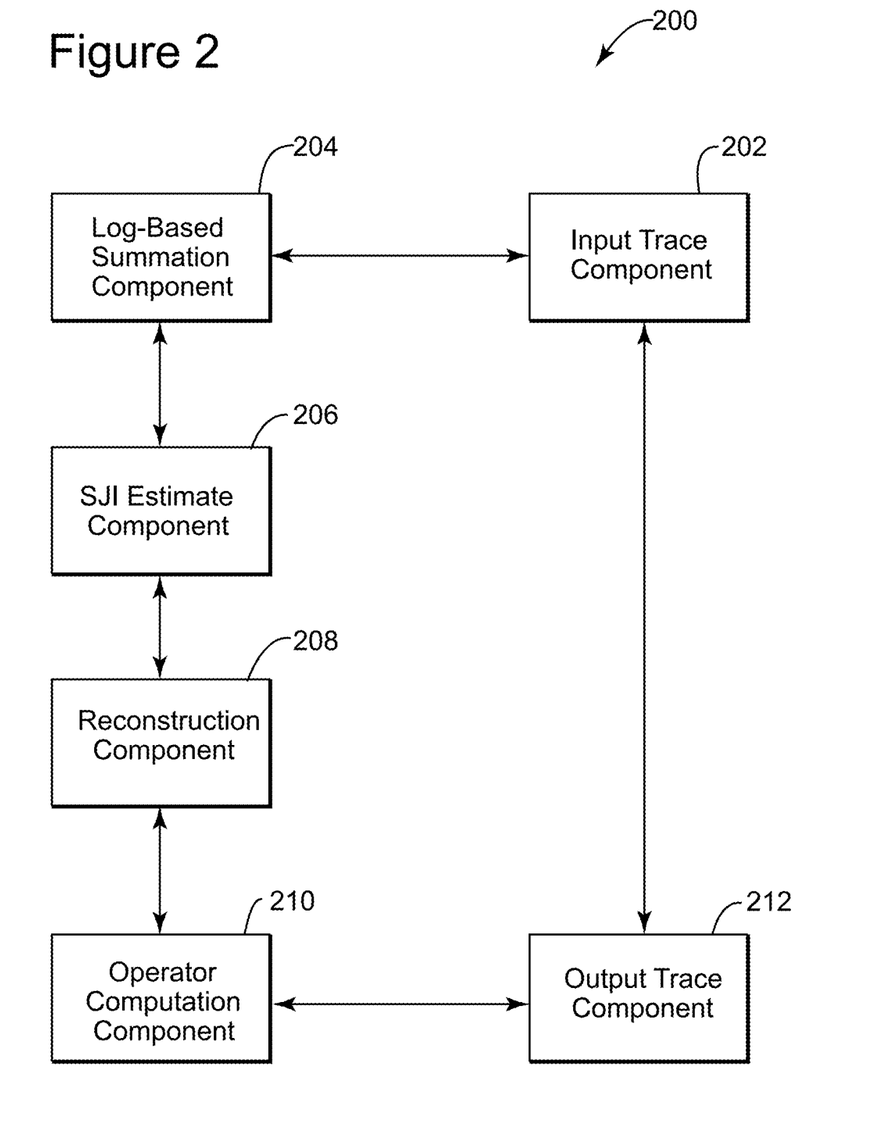
FIG. 2 is a schematic diagram of an exemplary embodiment surface-consistent amplitude and deconvolution simultaneous joined inversion system for simultaneously processing input trace data and outputting a corresponding gain and deconvolution operator.

Looking now to FIG. 2, a schematic diagram of a system for performing a surface-consistent amplitude and deconvolution simultaneous joined inversion estimation 200 is depicted. The simultaneous joined inversion estimation 200 comprises an input trace component 202, a log-based summation component 204, a Simultaneous Joined Inversion (SJI) estimation component 206, a reconstruction component 208 an operator computation component 210 and an output trace component 212. Continuing with the exemplary embodiment, the input trace component 202 does a single read of the input data and provides the input data to the other components as necessary. It should be noted in the exemplary embodiment that the estimated surface consistent components can be the shot points, the receivers, the offsets and the bins. Further in the exemplary embodiment, other estimated surface consistent components can be added, i.e., azimuth, inline or broadside offsets.

Next in the exemplary embodiment, the log-based summation component 204 calculates a Root Mean Square (RMS) amplitude value and an autocorrelation spectrum within a specified time window for every input trace. Further in the exemplary embodiment, the log-based summation component 204, in the log domain, the RMS amplitudes and the autocorrelations are summed for each component value to build complete initial amplitude log-scalars and spectral log-frequency sums for further processing.

Continuing with the exemplary embodiment of the simultaneous Joined inversion estimation 200, the SJI estimate component 206 uses the initial sums calculated by the log-based summation component 204 in an iterative calculation. It should be noted in the exemplary embodiment that the iterative calculation solves the linear set of surface-consistent equations in a least squares manner in order to simultaneously and independently estimate the amplitude log-scalar and the spectra log-frequency for each surface-consistent component. It should further be noted that the iterations are constrained by a preconfigured amplitude/spectrum joined convergence criteria. In one aspect of the exemplary embodiment, an iterative method such as Gauss-Seidel method can be used to converge on an estimation of the amplitude log-scalars and the spectra log-frequency. In another aspect of the exemplary embodiment, if the log-frequency domain is avoided, a non-linear least square classic technique can be used and the estimation of the surface-consistent amplitude and spectra can be joined with the inversion.

Continuing with the exemplary embodiment, in the surface-consistent model, any seismic attribute "T," such as the amplitude or autocorrelation spectrum value, can be described as a combination of different factors, i.e., a global average factor "G" dealing mainly with the average shot waveform, a source factor S(i) at surface position "i" which includes near-surface effects on the downward source wave front and a receiver factor "R(j)" at surface position "j" which includes near-surface effects on the upward reflected wave front. In another aspect of the exemplary embodiment, other factors can refine the basic surface consistent model and comprise the subsurface response "B(k)" at location "k=½(i+j)" that includes any anomalous response characteristic at the midpoint, the offset response O(l) at offset position "l=j−1" that includes any offset-related effects and the response driven by azimuth "A(m)" that corresponds to the direction of the source "S(i)" and the receiver "R(j)" and could include any oriented anomalous response.

In the surface-consistent amplitude process of the exemplary embodiment, the attribute $T_{AMP}$ is an RMS amplitude scalar which is decomposed into a product of several terms $$T_{AMP}=G_{AMP}\,S_{AMP}(i)R_{AMP}(j)B_{AMP}(k)O_{AMP}(l)A_{AMP}(m) \quad \text{Eq. 1}$$

and in the surface-consistent deconvolution process the attribute $T_{DEC}$, corresponding to the amplitude of the autocorrelation spectrum at the frequency f, which is decomposed into a product of similar terms $$T_{DEC}(f)=G_{DEC}(f)S_{DEC}(l,f)R_{DEC}(j,f)B_{DEC}(k,f)O_{DEC}(l,f)\\A_{DC}(m,f) \quad \text{Eq. 2}$$

It should be noted that equation 1 cannot be derived from equation 2. However, both terms can be estimated simultaneously with the same inversion scheme through the use of a Simultaneous Joint Inversion approach. Accordingly, an exemplary embodiment equation, representing equation 1 and equation 2, as a product of several terms and linearized, when using the logarithmic domain, can be represented by the equation $$\log(T)=\log(G)+\log(S)+\log(R)+\log(B)+\log(O)+\log(A) \quad \text{Eq. 3}$$

Next in the exemplary embodiment, equation 3 is applied to all the input traces to create a matrix comprising "n" rows and "m" columns where "n" is the total number of traces and "m" is the total number of surface-consistent components. It should be noted in the exemplary embodiment that this system is over-determined and can be resolved in a least squares manner as "$^tA$ A x=$^tA$ b" where "$^tA$ A" is a "n" rows "m" columns matrix having its diagonal value equal to the trace coverage per component. Continuing with the exemplary embodiment for the simultaneous joint inversion, "tA b" vectors are filled with the sums, per component, of log-amplitude scalars and with the sums, per component, of log-autocorrelation spectrum amplitude values for each frequency f, i.e., filling "Nyquist+1" vectors of length of length "m."

In another aspect of the exemplary embodiment, an iterative method such as but not limited to an improved Gauss-Seidel iteration is used to simultaneously and independently estimate each log-amplitude scalar and each log-autocorrelation spectrum amplitude value for each surface-consistent component. It should be noted in the exemplary embodiment that the iterative method implies "Nyquist+1" simultaneous and parallel inversions. It should further be noted that the simultaneous joint inversion process is stopped when a predefined gradient variation is observed on a joint amplitude/spectrum cost function.

Next in the exemplary embodiment, the reconstruction component 208 uses the final amplitude log-scalar and spectra log frequency estimates in conjunction with the input trace component values to reconstruct the amplitude scalar and autocorrelation. Further in the exemplary embodiment, operator computation component 210 calculates gain and deconvolution operators corresponding to the reconstructed amplitude scalar and autocorrelation. In another aspect of the exemplary embodiment, the output trace component 212 applies the gain and deconvolution operators to each input trace.

Figure 3:
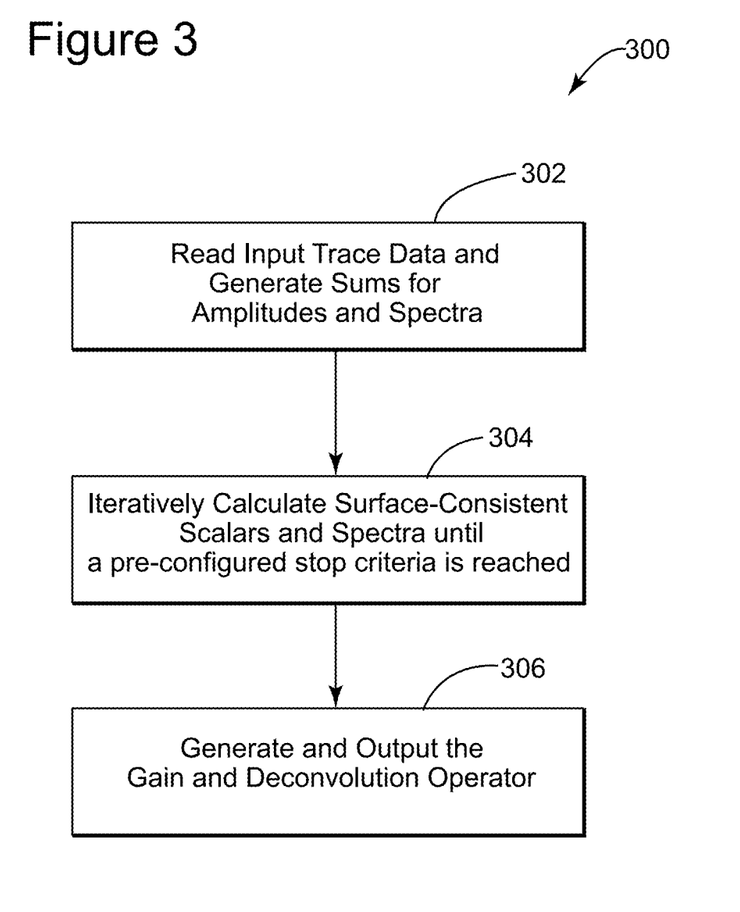
FIG. 3 is a flowchart illustrating a method for surface-consistent amplitude and deconvolution simultaneous joined inversion for simultaneously processing input trace data and outputting a corresponding gain and deconvolution operator.

Looking now to FIG. 3, an exemplary method embodiment of a Simultaneous Joined Inversion (SJI) 300 is depicted. Starting at step 302, the SJI 300 method reads the input trace data. In another aspect of the exemplary method embodiment step 302, the SJI method 300 generates an RMS amplitude value and an autocorrelation spectrum for each input trace. Further, step 302 of the exemplary method embodiment linearizes the RMS amplitudes and autocorrelations in the log domain and sums them for each component value to create initial log amplitude scalars and spectra log frequency sums.

Next, at step 304, the SJI 300 method uses an iterative method to solve the linear set of surface-consistent equations in a least squares manner. In another aspect of step 304 of the exemplary method embodiment, the SJI 300 method estimates, simultaneously and independently, each amplitude log scalar and spectra log frequency value for each component. Continuing at step 306 of the exemplary method embodiment, the SJI method 300 reconstructs the amplitude scalar and autocorrelation spectra from the input trace component values. In another aspect of step 306 of the exemplary method embodiment, the SJI method 300 calculates the corresponding gain and deconvolution operator and outputs them for distribution or for use in further calculations.

Figure 4:
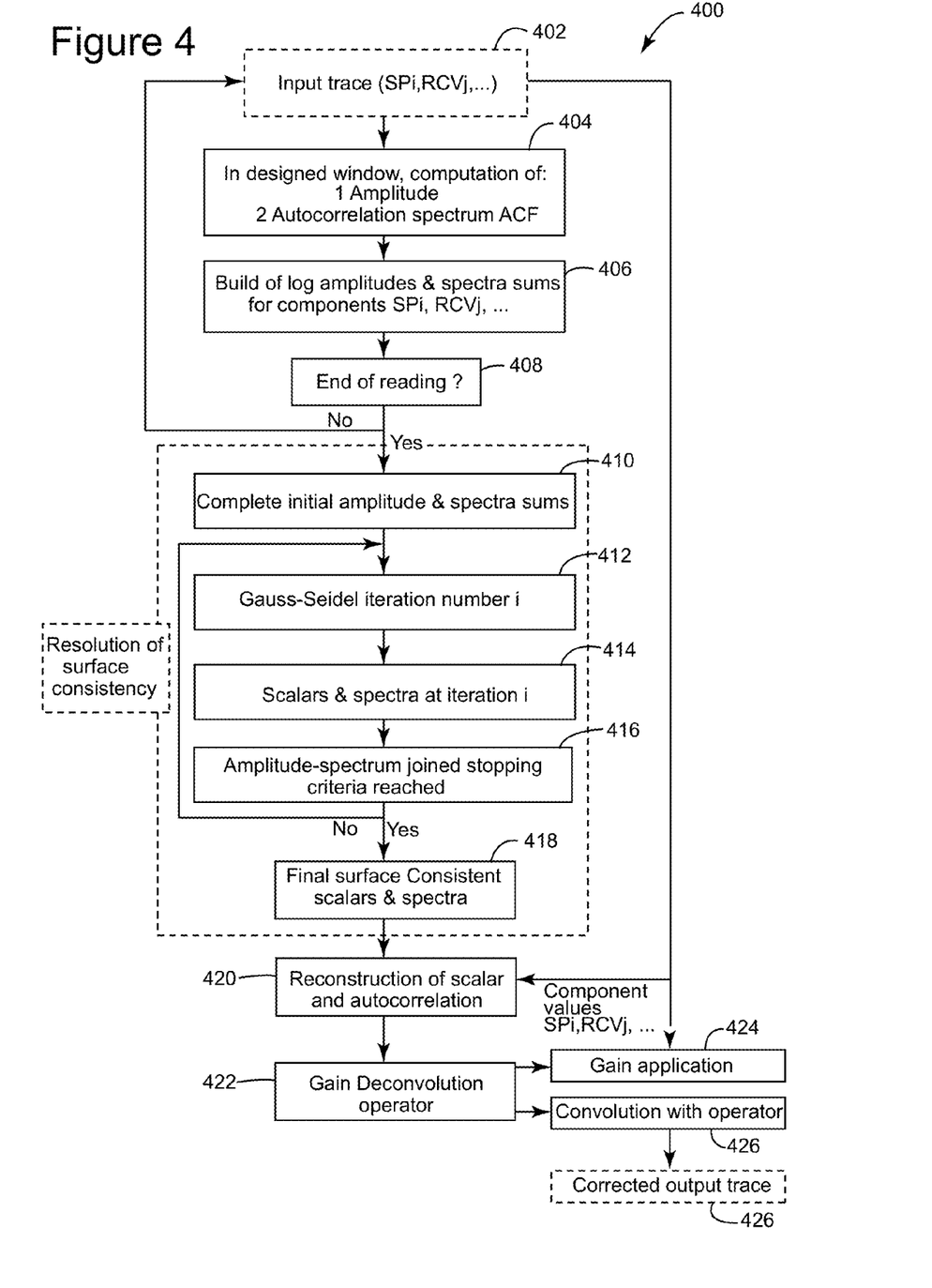
FIG. 4 is a flowchart illustrating a detailed method for surface-consistent amplitude and deconvolution simultaneous joined inversion for simultaneously processing input trace data and outputting corrected input trace data.

Looking now to FIG. 4, an exemplary method embodiment further describes the iterative steps 400 of a joined inversion. Beginning the exemplary method embodiment, preparation for a joined inversion comprises reading the input trace data at step 402, calculating the RMS amplitude value and the autocorrelation spectrum within a specified time window at step 404, converting the calculated values to the log domain and summing the calculated values for each component at step 406. It should be noted in the exemplary embodiment that after each summation of step 406, a determination is made at step 408 if any input trace data remains for inclusion in the analysis. If more trace data remains then the exemplary method embodiment returns to step 402 and reads the next input trace value, otherwise the exemplary method embodiment continues to step 410. It should further be noted in the exemplary embodiment that the input trace data is read only one time for the entire analysis.

Next, at step 410 of the exemplary method embodiment, the complete initial values for the amplitude log scalars and the spectra log frequency sums, calculated in steps 402 through 408 are presented, as the initial estimate, to the iterative method to solve the surface-consistent set of linear equations. Next at step 412, a Gauss-Seidel iteration is performed to simultaneously and independently estimate at each amplitude log scalar and each spectra log frequency for each component at step 414. It should be noted in the exemplary embodiment at step 416, that the amplitude log scalars and the spectra log frequency sums share, i.e. are joined by, the preconfigured convergence criteria. Next at step 418 of the exemplary embodiment, once the joined convergence criteria of step 416 are reached, the final surface consistent scalars and spectra are generated.

Continuing at step 420, the final surface-consistent scalars and spectra are used to reconstruct the amplitude scalar and autocorrelation spectra from the component values of the input trace data. Then, at step 422, the corresponding gain and deconvolution operators are calculated. It should be noted in the exemplary embodiment that the gain and deconvolution operators can be applied, as indicated at steps 424 and 426 of the exemplary embodiment to the input trace data from step 402 to generate corrected output trace data as shown at step 428.

Figure 5:
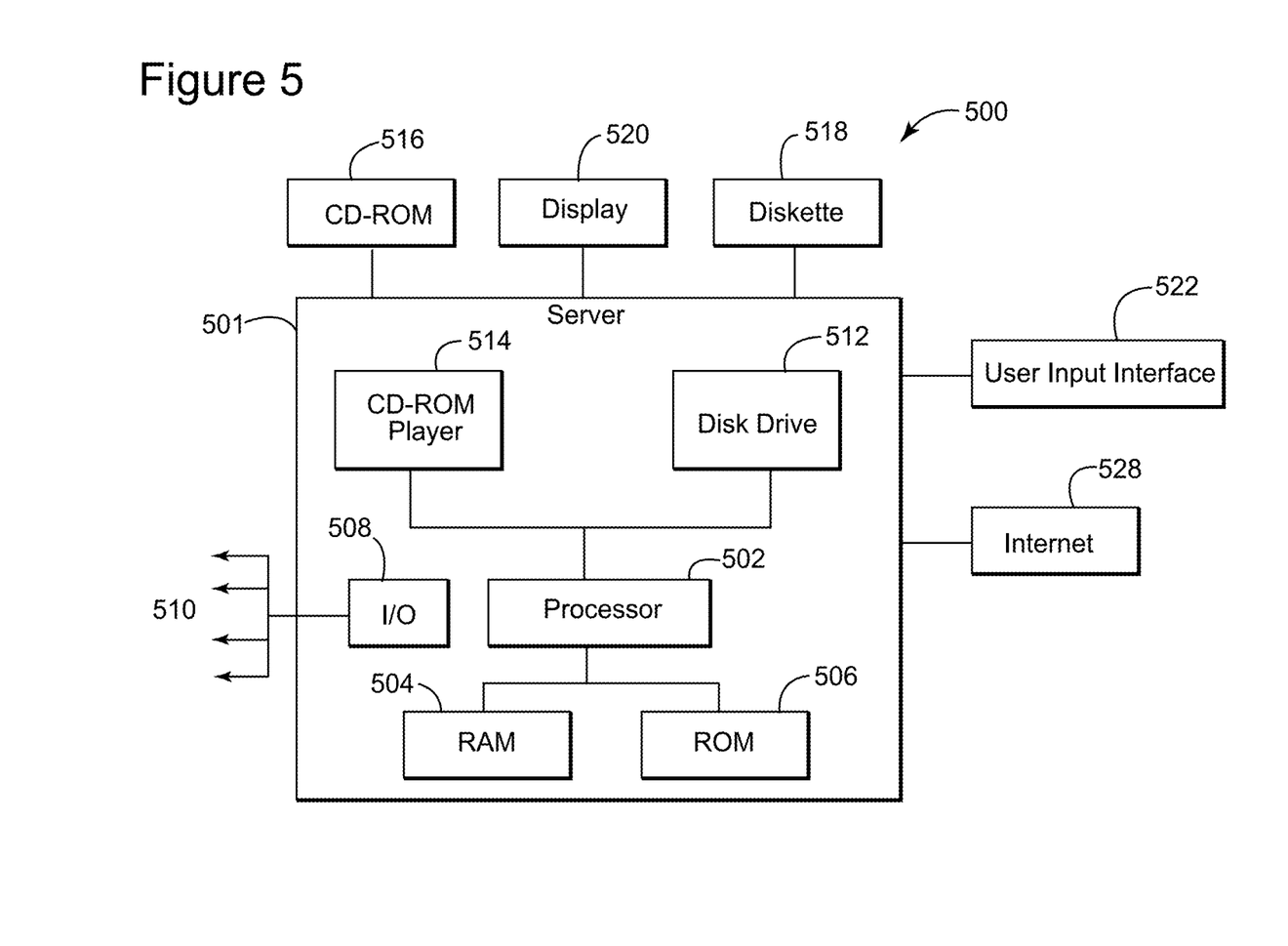
FIG. 5 is a schematic diagram of a computerized system that implements various methods according to an exemplary embodiment.

One or more of the methods discussed above may be implemented in a computerized system as shown in FIG. 5. Such a computerized system 500 may receive, via the input/output interface 502, information pertinent to the data. In addition, the computerized system 500 may include a processor 504 for processing the above-noted data and for calculating, for example, the global energy of a station. The interface 502 and the processor 504 are connected to a bus 506. Further, the computerized system 500 may include a memory 506 to store the above-noted data, a display 510, a connection 512 to the data and other elements common for a computerized system or server as would be recognized by those skilled in the art.

Figure 6:
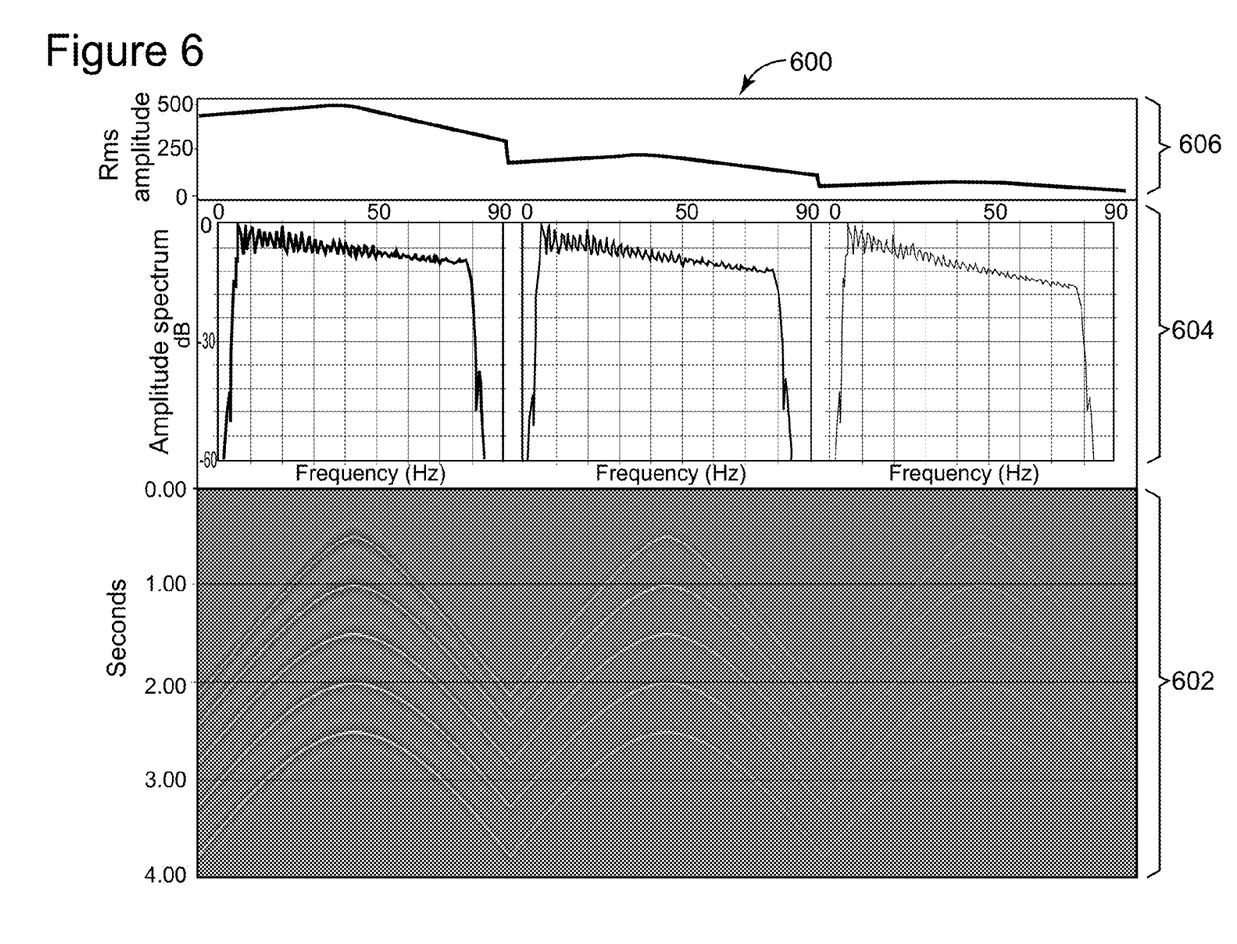
FIG. 6 is a composite schematic diagram of three shot points on a two dimensional line with its associated RMS amplitude and amplitude spectra with an added surface-consistent amplitude anomaly and a frequency spectral distortion.
Figure 7:
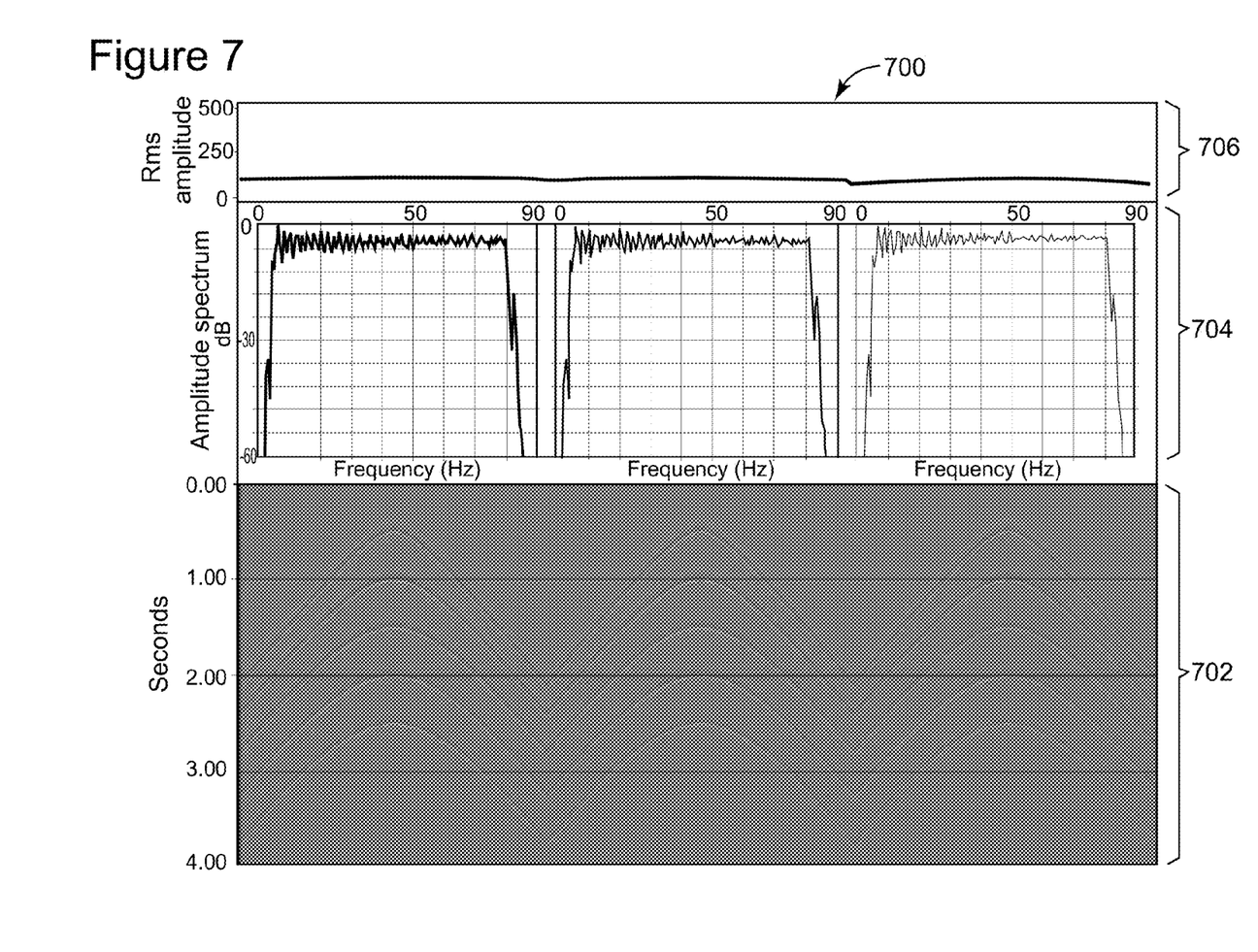
FIG. 7 is a composite schematic diagram of three shot points on a two dimensional line with its associated RMS amplitude and amplitude spectra with an added surface-consistent amplitude anomaly and a frequency spectral distortion after an exemplary embodiment surface consistent amplitude and deconvolution simultaneous joined inversion.

The results of an exemplary embodiment of the aforementioned Simultaneous Joined Inversion (SJI) are illustrated in a comparison between FIG. 6 and FIG. 7. In the example depicted in FIG. 6 and FIG. 7, a two-dimensional synthetic seismic dataset with five hyperbolas is generated. Then the example dataset is injected with a surface-consistent amplitude anomaly and a frequency spectral distortion. It should be noted that FIG. 6 represents the plotted dataset with the injected error and that these distortions are well illustrated on seismic data 602 and with frequency-dependent amplitude decays 604 and an RMS amplitude variation 606 from shot to shot. FIG. 7 represents the same seismic data after a surface-consistent amplitude and deconvolution simultaneous joined inversion where it is shown that the amplitude and spectra distortion have been corrected on the seismic data 702. This correction is illustrated by the flat RMS amplitude curves 706 from trace to trace and the flat amplitude spectra 704 from shot point to shot point.

Figure 8A:
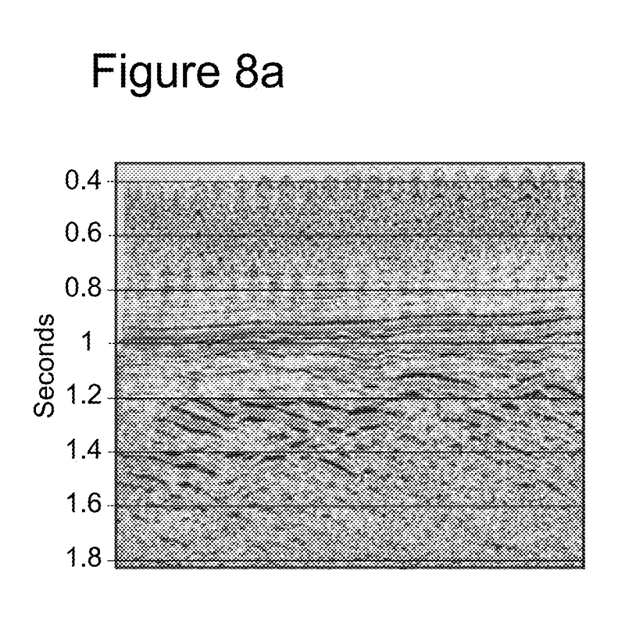
Figure 8B:
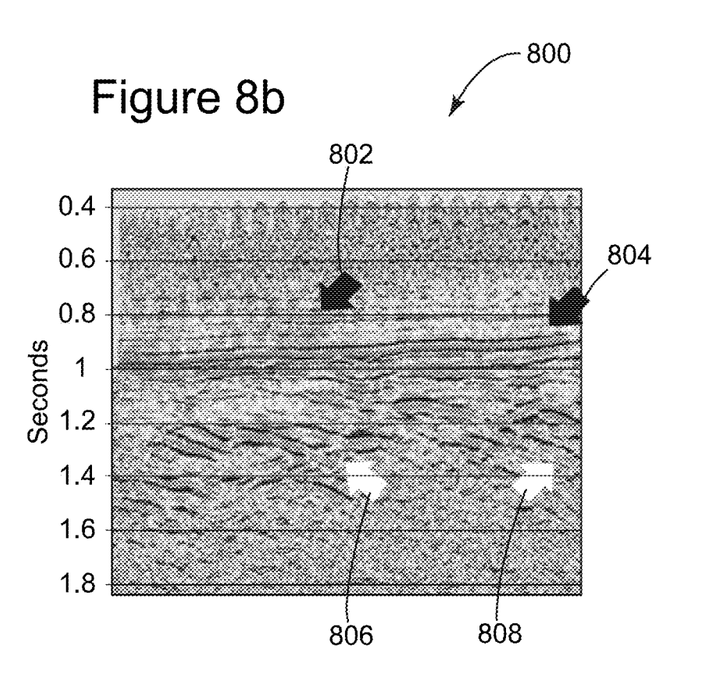

In another example, FIG. 8a represents an inline stack of three-dimensional seismic data after a conventional cascaded, i.e., two-pass, surface-consistent amplitude and deconvolution flow and FIG. 8b represents an inline stack of the same three-dimensional seismic data after a surface-consistent simultaneous joined inversion amplitude and deconvolution flow. Comparing FIGS. 8a to 8b, the simultaneous joined inversion shows improvement in the lateral continuity of the weak shallower events above the basaltic lavas, as indicated at arrow 802 and arrow 804. Further, the example shows an improvement by the simultaneous joined inversion of the focusing and resolution of the reflectors inside the basaltic lavas, indicated by arrow 806 and arrow 808, as compared to the same location on FIG. 8a. In summary of the described examples and results, improvements are based on properly splitting the part of each term (amplitude and deconvolution) in order to produce a more stable solution from the lower to the higher frequency part of the data.

The above-disclosed exemplary embodiments provide a system and a method for surface-consistent amplitude and deconvolution simultaneous joined inversion. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. Further, it is noted that the above embodiments may be implemented in software, hardware or a combination thereof. It is also noted that although the previously described exemplary embodiments refer to land-based seismic data acquisition, the methods and systems described herein are equally applicable to marine based seismic data acquisition.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, stored in a memory and executing on a processor, for estimating a surface-consistent amplitude correction and a deconvolution operator, said method comprising:
simultaneously utilizing a plurality of input seismic traces from recorded seismic data, in a single pass, to calculate an amplitude value and an autocorrelation spectrum, within an associated time window, for each of said plurality of input seismic traces;
transforming said amplitudes and said autocorrelations to a log domain and summing for each surface-consistent component value to create an initial amplitude log scalar and an initial spectra log-frequency sum estimate;
performing one or more iterations to simultaneously and independently estimate an improved amplitude log scalar and a spectra log-frequency value, with a shared solver, for each surface-consistent component until a shared predetermined stop condition for said estimating is met; and
outputting one or more of an estimated surface-consistent amplitude correction and a deconvolution operator to be used to correct the plurality of input seismic traces by reconstructing an amplitude scalar and a autocorrelation spectrum from said plurality of input seismic traces using surface-consistent component values, after said stop condition is met.

2. The method of claim 1, wherein said one or more iterations are Gauss-Seidel method iterations.

3. The method of claim 2, wherein said stop condition is a common convergence criterion shared between said amplitude log scalar estimation and said spectra log-frequency value estimation.

4. The method of claim 3, wherein said plurality of input seismic traces is read from storage only one time during said method.

5. The method of claim 3, further comprising applying said amplitude correction and said deconvolution operator to said plurality of input seismic traces and outputting corrected input seismic traces.

6. The method of claim 5, further comprising generating pre-stack or stack seismic data based on said corrected input seismic traces.

7. The method of claim 1, wherein said initial amplitude log scalar and said initial spectra log-frequency sum are estimated from sets of surface-consistent linear equations.

8. The method of claim 7, wherein said sets of surface-consistent linear equations are solved with a least squares approach.

9. The method of claim 1, wherein said surface-consistent components comprises shot points, receivers, offsets or bins.

10. The method of claim 9, wherein said surface-consistent components further comprise azimuth offsets, inline offsets or broadside offsets.

11. A system for estimating a surface-consistent amplitude correction and a deconvolution operator, said system comprising:
a plurality of input seismic traces from recorded seismic data;
one or more processors configured to execute computer instructions and a memory configured to store said computer instructions wherein said computer instructions further comprise:
an input trace data component for accessing said plurality of input seismic traces and generating a plurality of amplitude values and a plurality of autocorrelation values for each of said plurality of input seismic traces;
a summation component for generating complete initial amplitude log scalars and spectra log frequency sums;
a simultaneous joined inversion component for estimating, simultaneously and independently, an amplitude log-scalar and a spectra log-frequency sum for surface-consistent components of said input seismic traces;
a reconstruction component for reconstructing an amplitude scalar and an autocorrelation spectrum based on said plurality of input seismic traces using surface-consistent component values and
an operator computation component for generating a surface-consistent amplitude correction and a surface consistent deconvolution operator to be used to correct the plurality of input seismic traces based on said amplitude scalar and said autocorrelation spectrum and outputting said amplitude correction and said deconvolution operator.

12. The system of claim 11, further comprising an output trace component for applying said amplitude correction and said deconvolution operator to said input seismic traces for transforming said input seismic traces to corrected input seismic traces.

13. The system of claim 12, wherein said output trace component further comprises generating a pre-stack or stack seismic image based on said corrected input seismic traces.

14. The system of claim 11, wherein said simultaneous joined inversion component further comprises an iteration model.

15. The system of claim 14, wherein said iteration model is a Gauss-Seidel model.

16. The system of claim 14, wherein said iteration model further comprises a predetermined stop condition for ending the iteration model.

17. The system of claim 16, wherein said stop condition is a common convergence criterion associated with said amplitude scalar and said spectra frequency value.

18. The system of claim 16, wherein said amplitude scalar and said spectra frequency value are linearized in the log domain.

19. The system of claim 11, wherein said input trace data component reads said plurality of input seismic traces only one time for estimating said surface-consistent amplitude correction and said deconvolution operator.

20. The system of claim 11, wherein said surface-consistent components comprise shotpoints, receivers, offsets, bins, azimuth offsets, inline offsets or broadside offsets.

* * * * *